3,636,082
CARBONYLATION OF ORGANIC HALIDES
WITH METALLIC ALCOHOLATES
Richard N. Knowles, Hockessin, Del., assignor to E. I.
du Pont de Nemours and Company, Wilmington, Del.
No Drawing. Filed Jan. 3, 1969, Ser. No. 788,944
Int. Cl. C07c 69/76
U.S. Cl. 260—475 R          7 Claims

ABSTRACT OF THE DISCLOSURE

Organic esters are prepared by reacting an organic halide, an alkali or alkaline earth alcoholate and carbon monoxide at elevated temperature and pressure, in the presence of a palladium catalyst and carbon dioxide.

SUMMARY OF THE INVENTION

Organic esters are prepared by reacting at elevated temperature and pressure (1) carbon monoxide, (2) an organic halide selected from aralkyl halide, aryl halide, alkyl halide, alkenyl halide, alkynyl halide, cycloalkenyl halides or cycloalkyl halide, where the halide is iodine, bromine or chlorine, and (3) an alkali or alkaline earth alcoholate of 1 to 6 carbon atoms, said reaction takes place in the presence of (a) at least one equivalent of carbon dioxide per equivalent of alcoholate, (b) between 0.01 to 50 mole percent of palladium based on the organic halide. When the organic halide is an alkyl halide, it is to be understood that normal-alkyl halides are iodides.

A preferred embodiment is the production of dimethyl or diethyl 4,4'-biphenyldicarboxylate by the reaction of 4,4'-biphenyldibromide with sodium methylate or sodium ethylate and carbon monoxide in the presence of a palladium catalyst and carbon dioxide. The process of this invention generally gives good yields of organic esters which exhibit excellent purity. In the above preferred embodiment for preparing dimethyl 4,4'-biphenyldicarboxylate yields in excess of 70% can be obtained where the diester has a purity of better than 99%.

GENERAL DESCRIPTION OF THE INVENTION

The organic halide can be an aryl halide, aralkyl halide, alkyl halide, alkenyl halide, alkynyl halide, cycloalkenyl halide, or a cycloalkyl halide which can be substituted with additional organic radicals such as nitrile or acetyl groups which are inert during the process.

The halides which can be used are iodine, bromine and chlorine. The decreasing order of reactivity of the halides is iodine, bromine and chlorine. When a *normal* alkyl halide is used in this process, the halide must be iodine. In all other organic halides except the alkyl halides, it is preferred to use bromine or chlorine.

The organic halides can contain more than one halide substituent and can even contain several different halides such as combinations of chlorine and bromine. When such combinations are used, the temperature and quantities of reactants can be controlled to take advantage of the relative reactivities of the halides to form an ester from the most reactive halide, or the conditions can be varied to react all of the halide substituents.

Similarly, more than one halide substituent can be attached to the organic molecule, and the relative position of a particular halide to another halide on the organic molecule can cause it to be more reactive in the process of this invention. The reactivity of any organic halide can easily be determined empirically.

Typical organic halides suitable for the process of this invention are methyl chloroacetate, propargyl bromide, 4-bromoanisole, 4-bromotoluene, chloroacetonitrile, 2-bromoacetophenone, t-butylbromide, 4-bromobenzonitrile, 3-bromocyclohexene, 2-iodopropane, 1-chloroacetone, 1-bromoacetone, 2-chloroacetophenone, 2-chloropropiophenone, 3-bromo-2-butanone, 3-chloro-2-pentanone and 4-methoxy-α-chlorotoluene.

The alcoholate used for the carbonylation is an alkali or alkaline earth alcoholate where the organic portion can be a hydrocarbyl group of $C_1$ to $C_6$.

The reaction requires carbon monoxide and in addition, at least one equivalent of carbon dioxide per equivalent of the alcoholate in order to prevent ether byproducts in the reaction. Both of these gases, however, may be present in up to 10-fold excess. The upper limit as a practical matter is based upon the cost of excess materials.

Elemental palladium, palladium salts such as $PdCl_2$ and $Pd(NO_3)_2$ or palladium oxides can be used to catalyze the reaction, but the use of these finely-divided materials is less convenient than is the use of a supported palladium catalyst because of separation problems. The preferred catalyst is elemental palladium on carbon. Other supports which are useful include $\gamma$-$Al_2O_3$, $\eta$-$Al_2O_3$, $\kappa$-$Al_2O_3$, $\psi$-$Al_2O_3$, silica, titania, zirconia, kieselguhr, mixed rare earth oxides or carbonates, barium carbonate, barium sulfate, calcium carbonate, pumice, silica-alumina mixtures, and a variety of molecular sieves. A typical supported catalyst contains 5% elemental palladium by weight. These palladium catalysts not only give excellent results, but are less toxic than other metal carbonyl-type catalysts. Between 0.01–50 mole percent of palladium based on the organic halide starting material is used to catalyze the reaction; 0.1–5 mole percent is preferred. The supported palladium catalysts are better suited for use in continuous reactors than other metal carbonyl catalysts because they are solid and can be mounted in fixed beds.

This reaction may be carried out batchwise in a bomb reactor. The alcoholate and organic halide are placed in the reactor. The desired amount of $CO_2$ is added on a weight basis to the bomb after it has been cooled. The bomb is then charged at room temperature with carbon monoxide. For a 400 cc. reactor, 7–10 atmospheres of carbon monoxide (103–147 p.s.i.) is added. The amount of carbon monoxide added will depend on the reactor size, the amount of organic halide present, and the desired pressure at the operating temperature. The reactor is heated such that the total pressure at elevated temperatures is in the 100–5000 p.s.i. range; 200–1000 p.s.i. is preferred. Higher pressures can be used but they are not needed for this process. This reaction does not require as high a pressure in order to obtain satisfactory yields as compared to conventional carbonylation procedures.

The reaction time and temperature depend on the organic halide starting material. For example the reaction can be run from 15 minutes to more than 5 hours at temperatures between 100° C. to 400° C.

The reaction time for preparing the preferred dimethyl 4,4'-biphenyldicarboxylate is in the range of 15 minutes to 3 hours at temperatures of 300° C. to 200° C. respectively. A preferred condition for production is a reaction time of one hour at 225–275° C.

This reaction is operable in the absence of solvent; however, it is preferred that a solvent with no active hydrogen atoms be present for both batch and continuous operation. Suitable solvents include xylene, acetonitrile, Decalin, diisopropylbenzene, and toluene. At the temperatures of the reaction, these solvents will contribute considerably to the total pressure. Although small amounts of moisture can be tolerated, the reaction should be carried out under anhydrous conditions for best results.

After the carbonylation reaction is complete, the reaction mixture is cooled and the product, catalyst, and alkali or alkaline earth halide by-product are slurried in the boiling solvent. The heated slurry is filtered to remove the catalyst and the inorganic halide by-product. The method of isolation (crystallization, distillation, etc.) of the ester product will depend on its physical properties. In the preferred embodiment, the dimethyl 4,4'-biphenyldicarboxylate crystallizes in better than 99% purity as the solvent cools to room temperature.

The inorganic halide by-product can be removed from the catalyst by washing with water and the halogen recovered by conventional methods if desired. For continuous operation, the gases over the product consist of $CO_2$ and excess CO and may be recycled directly to the reactor.

The esters produced by this process are well known and are widely used as chemical intermediates, solvents, etc. Certain esters prepared by the process of this invention are useful as a polymer intermediates and others can be used as herbicides.

Example 1

A 400 cc. stainless steel bomb is charged with 12.5 g. of 4,4'-dibromobiphenyl, 4.4 g. of sodium methoxide (in an ampule under nitrogen), 5 g. of 5% palladium on carbon, and 50 ml. of xylene. After the bomb is purged with nitrogen, 5.3 g. of carbon dioxide is added, and the bomb is pressurized to 150 p.s.i.g. with carbon monoxide. The bomb is sealed, and placed in a rack where it can be both heated and shaken. The agitating mixture is heated for 1 hour at 250° C. under autogenous pressure. The bomb is then cooled to ambient temperature, and the excess carbon monoxide and the carbon dioxide are vented. The slurry from the bomb is boiled in 400 ml. of xylene, and filtered hot. The residual palladium on carbon and sodium bromide are washed with an additional 200 ml. of boiling xylene. The sodium bromide is removed from the catalyst by sequentially washing the mixture with methanol under nitrogen and then water. The dried catalyst can be reused in another carbonylation reaction.

The xylene filtrate is concentrated to 300 ml., and cooled to room temperature. The dimethyl 4,4'-biphenyldicarboxylate crystallizes from the colorless filtrate as long, broad needles which are filtered and washed with 100 ml. of xylene. In a normal reaction, about 7 g. of product is isolated which melts at 214–216° C.

The xylene filtrate is stripped in vacuum leaving 1.5 g. of residue consisting of dimethyl 4,4'-biphenyldicarboxylate, methyl 4-(4-bromophenyl)benzoate, and 4,4'-dibromobiphenyl. Occasionally small quantities of 4-bromobiphenyl and methyl 4-phenylbenzoate are also observed in the residue.

Both the residue and the dimethyl 4,4'-biphenyldicarboxylate are analyzed by gas-liquid chromatography using a ¼" x 10' column packed with 3% OV–17 on Gas Chrom Q. The instrument is programmed from 185 to 285° C. at 6° C./min. Quinoline is used as internal standard. Dimethyl 4,4'-biphenyldicarboxylate is usually obtained in better than 99% purity.

Example 2

A 400 cc. stainless steel bomb is charged with 12.5 g. of 4,4'-dibromobiphenyl, 4.4 g. of sodium methoxide (in an ampule under nitrogen), 5 g. of 5% palladium on carbon, and 50 ml. of anhydrous acetonitrile. After the bomb is purged with nitrogen, 5.3 g. of carbon dioxide is added, and the bomb is pressurized to 360 p.s.i.g. with carbon monoxide. The bomb is sealed, and placed in a rack where it can be both heated and shaken. The agitating mixture is heated for 1 hour at 250° C. under autogenous pressure (1250–1330 p.s.i.g.). The dimethyl 4,4'-biphenyldicarboxylate (4.3 g.) is isolated and analyzed according to the procedures in Example 1.

Example 3

A 400 cc. stainless steel bomb is charged with 12.5 g. of 4,4'-dibromobiphenyl, 4.4 g. of sodium methoxide (in an ampule under nitrogen), 5 g. of 5% palladium on carbon, and 50 ml. of xylene. After the bomb is purged with nitrogen, 5.3 g. of carbon dioxide is added, and the bomb is pressurized to 360 p.s.i.g. with carbon monoxide. The bomb is sealed and placed in a rack where it can be both heated and shaken. The agitating mixture is heated for 15 minutes at 325° C. under autogenous pressure. The dimethyl 4,4'-biphenyldicarboxylate is isolated and analyzed according to the procedures of Example 1.

Example 4

A 400 cc. stainless steel bomb is charged with 12.5 g. of 4,4'-dibromobiphenyl, 4.4 g. of sodium methoxide (in an ampule under nitrogen), 5 g. of 5% palladium on carbon, and 50 ml. of xylene. After the bomb is purged with nitrogen, 5.3 g. of carbon dioxide is added, and the bomb is pressurized to 360 p.s.i.g. with carbon monoxide. The bomb is sealed, and placed in a rack where it can be both heated and shaken. The agitating mixture is heated for 3 hours at 200° C. under autogenous pressure. The dimethyl 4,4'-biphenyldicarboxylate is isolated and analyzed according to the procedures of Example 1.

Example 5

A 400 cc. stainless steel bomb is charged with 12.5 g. of 4,4'-dibromobiphenyl, 4.4 g. of sodium methoxide (in an ampule under nitrogen), 5 g. of 5% palladium on alumina, and 50 ml. of xylene. After the bomb is purged with nitrogen, 5.3 g. of carbon dioxide is added, and the bomb is pressurized with 360 p.s.i.g. of carbon monoxide. The bomb is sealed, and placed in a rack where it can be both heated and shaken. The agitating mixture is heated for 1 hour at 250° C. under autogenous pressure. The dimethyl 4,4'-biphenyldicarboxylate (5.6 g.), is isolated and analyzed according to the procedures of Example 1.

Example 6

A 400 cc. stainless steel bomb is charged with 12.5 g. of 4,4'-dibromobiphenyl, 21.6 g. of sodium methoxide, 5 g. of 5% palladium on carbon and 50 ml. of xylene. After the bomb is purged, 22 g. of carbon dioxide is added, and the bomb is pressurized to 590 p.s.i.g. with carbon monoxide. The bomb is sealed, and placed in a rack where it can be both heated and shaken. The agitating mixture is heated for 2 hours at 250° C. under autogenous pressure. The dimethyl 4,4'-biphenyldicarboxylate (4.0 g.), is isolated and analyzed according to the procedures of Example 1.

Example 7

A 400 cc. stainless steel bomb is charged with 12.5 g. of 4,4(-dibromobiphenyl, 4.4 g. of sodium methoxide (in an ampule under nitrogen), 5 g. of 5% palladium on carbon, and 50 ml. of xylene. After the bomb is purged with nitrogen, 5.3 g. of carbon dioxide is added, and the bomb is pressurized to 118 p.s.i.g. with carbon monoxide. The bomb is sealed, and placed in a rack where it can be both heated and shaken. The agitating mixture is heated for 1 hour at 250° C. under autogenous pressure. The dimethyl 4,4'-biphenyldicarboxylate is isolated and analyzed according to the procedures of Example 1.

Example 8

A stirred, pressure reactor is fitted with heat transfer coils and jacket, baffles, a gas entrainment device, a dip tube and inlet tube. This reactor is run at 250° C. at a pressure varying between 500–1000 p.s.i.g. while 4,4'-dibromobiphenyl dissolved in xylene, 5% palladium on carbon slurried in xylene, and a slurry formed by the reaction of a xylene slurry of sodium methoxide and carbon dioxide, are continuously fed to the reactor. A low carbon dioxide partial pressure and high carbon monoxide partial pressure are maintained in the reactor. The ingredients are fed to the reactor using high pressure, positive displacement pumps. The product slurry is continuously pumped from the reactor to a filter at 250° C. where the palladium on carbon and sodium bromide are removed. The reactants and product are pumped into and out of the reactor at such a rate so as to have an average residence time of 1 hour. For each kilogram of 4,4'-dibromobiphenyl fed to the reactor, 50–100 g. of 5% palladium on carbon, 350 g. of sodium methoxide, 325 g. of carbon dioxide and 4 kilograms of xylene are used.

The dimethyl 4,4'-biphenyldicarboxylate is isolated from the cooled xylene.

Example 9

A 400 cc. stainless steel bomb is charged with 8.9 g. of 4,4'-dichlorobiphenyl, 4.4 g. of sodium methoxide, and 5 g. of 5% palladium on carbon. After the bomb is purged with nitrogen, 5.3 g. of carbon dioxide is added, and the bomb is pressurized to 160 p.s.i.g. with carbon monoxide. The bomb is sealed, and placed in a rack where it can be both heated and shaken. The agitating mixture is heated for 5 hours at 350° C. under autogenous pressure (325–450 p.s.i.g.). The dimethyl 4,4'-biphenyldicarboxylate is isolated and analyzed according to the procedures of Example 1.

Example 10

A 400 cc. stainless steel bomb is charged with 5.9 g. of p-dichlorobenzene, 4.4 g. of sodium methoxide, and 5 g. of 5% palladium on carbon. After the bomb is purged with nitrogen, 5.3 g. of carbon dioxide is added, and the bomb is pressurized to 162 p.s.i.g. with carbon monoxide. The bomb is sealed and placed in a rack where it can be both heated and shaken. The agitating mixture is heated for 5 hours at 350° C. under autogenous pressure. The bomb is then cooled, and the slurry is boiled in xylene. The boiling solution is filtered to remove the catalyst and sodium chloride. The dimethyl terephthalate is isolated from the filtrate.

Example 11

The carbonylation reaction of Example 10 can be run using o-dichlorobenzene in place of the p-dichlorobenzene used in that example. The reaction is run in a similar fashion, and the dimethylphthalate is isolated from the final filtrate.

Example 12

The carbonylation of 4,4'-dibromobiphenyl can be accomplished according to the method of Example 1 by using Decalin as the solvent in place of the xylene; equal quantities are employed.

Example 13

The carbonylation of 4,4'-dibromobiphenyl can be accomplished according to the methods of Example 1 by using p-diisopropylbenzene in place of the xylene; equal quantities are employed.

Example 14

A 400 cc. stainless steel bomb is charged with 16.2 g. of 4,4'-diiodobiphenyl, 4.4 g. of sodium methoxide, 5 g. of 5% palladium on carbon, and 50 ml. of xylene. After the bomb is purged with nitrogen, 5.3 g. of carbon dioxide is added, and the bomb is pressurized to 160 p.s.i.g. with carbon monoxide. The bomb is sealed, and placed in a rack where it can be both heated and shaken. The agitating mixture is heated for 1 hour at 200° C. under autogenous pressure. The dimethyl 4,4'-biphenyldicarboxylate is isolated, and analyzed according to the procedures of Example 1.

Example 15

A 400 cc. stainless steel bomb is charged with 15.3 g. of 1-chloro-4-bromobenzene, 4.4 g. of sodium methoxide, 5 g. of 5% palladium on carbon and 50 ml. of xylene. After the bomb is purged with nitrogen, 5.3 g. of carbon dioxide is added, and the bomb is pressurized to 165 p.s.i.g. with carbon monoxide. The bomb is sealed, and placed in a rack where it can be both heated and shaken. The agitating mixture is heated for a period of 1 hour at 250° C. under autogenous pressure. The bomb is then cooled, and the slurry is boiled in 400 ml. of xylene. The hot slurry is filtered, and methyl 4-chlorobenzoate is isolated from the filtrate.

Example 16

A carbonylation reaction is run according to the procedure of Example 1, except that 5.5 g. of sodium ethoxide is used in place of the sodium methoxide. After completion of the reaction, diethyl 4,4'-biphenyldicarboxylate is isolated.

Example 17

A carbonylation reaction is run according to the procedure of Example 1 except that 10 g. of sodium hexyloxide is used in place of the sodium methoxide. After completion of the reaction, dihexyl 4,4'-biphenyldicarboxylate is isolated.

Example 18

A carbonylation reaction is run according to the procedure of Example 1, except that 4.1 g. of calcium methoxide is used in place of the sodium methoxide. After completion of the reaction, dimethyl 4,4'-biphenyldicarboxylate is isolated.

Example 19

A carbonylation reaction is run according to the procedure of Example 1, except that 0.38 g. of palladium chloride is used in place of the 5% palladium on carbon. After completion of the reaction, dimethyl 4,4'-biphenyldicarboxylate is isolated.

Example 20

A carbonylation reaction is run according to the procedure of Example 1, except that 0.47 g. of palladium nitrate is used in place of the 5% palladium on carbon. After completion of the reaction, dimethyl 4,4'-biphenyldicarboxylate is isolated.

Example 21

A 400 cc. stainless steel bomb is charged with 9.0 g. of chlorobenzene, 4.4 g. of sodium methoxide, 5 g. of 5% palladium on carbon, and 50 ml. of xylene. After the bomb is purged with nitrogen, 5.3 g. of carbon dioxide is added, and the bomb is pressurized to 165 p.s.i.g. with carbon monoxide. The bomb is sealed, and placed in a rack where it can be both heated and shaken. The agitating mixture is heated for 3 hours at 300° C. under autogenous pressure. The bomb is cooled, and the contents are boiled in 300 ml. of xylene. The boiling slurry is filtered, and methyl benzoate is isolated from the filtrate.

Example 22

A carbonylation reaction is run according to the procedure of Example 1, except that 5 g. of 5% palladium on barium carbonate is used in place of the palladium on carbon. After completion of the reaction, dimethyl 4,4'-biphenyldicarboxylate is isolated.

Example 23

A 400 cc. stainless steel bomb is charged with 16.4 g. of iodobenzene, 4.4 g. of sodium methoxide, 5 g. of 5% palladium on carbon, and 50 ml. of xylene. After the bomb is purged with nitrogen, 5.3 g. of carbon dioxide is added, and the bomb is pressurized to 165 p.s.i.g. with carbon monoxide. The bomb is sealed, and placed in a rack where it can be both heated and shaken. The agitating mixture is heated for 1 hours at 200° C. under autogenous pressure. The bomb is cooled, and the slurry is boiled in 300 ml. of xylene. The boiling slurry is filtered, and methyl benzoate is isolated from the filtrate.

Example 24

A 400 cc. stainless steel bomb is charged with 14.6 g. of p-bromobenzonitrile, 4.4 g. of sodium methoxide, 5 g. of 5% palladium on carbon, and 50 ml. of xylene. After the bomb is purged with nitrogen, 5.3 g. of carbon dioxide is added, and the bomb is pressurized to 165 p.s.i.g. with carbon monoxide. The bomb is sealed, and placed in a rack where it can be both heated and shaken. The agitating mixture is heated for 1 hour at 250° C. under autogenous pressure. The bomb is cooled, and the slurry is boiled in 300 ml. of xylene. The boiling slurry is filtered, and methyl p-cyanobenzoate is isolated from the filtrate.

Example 25

A 400 cc. stainless steel bomb is charged with 10.2 g. of α-chlorotoluene, 4.4 g. of sodium methoxide, 5 g. of 5% palladium on carbon and 50 ml. of xylene. After the bomb is purged with nitrogen, 5.3 g. of carbon dioxide is added, and the bomb is pressurized to 162 p.s.i.g. with carbon monoxide. The bomb is sealed, and placed in a rack where it can be both heated and shaken. The agitating mixture is heated at 200° C. for 1 hour under autogenous pressure (410–490 p.s.i.g.). The bomb is cooled, and the slurry is filtered. The filtrate is distilled at atmospheric pressure through a 40 cm. spinning band column. Methyl phenylacetate is distilled from the mixture at 70–73° C. at 2.8 mm. Hg ($n_D^{25}$ 1.5044).

Example 26

In a carbonylation reaction similar to that described in Example 25, 13.7 g. of α-bromotoluene is used in place of the α-chlorotoluene of that example. The reaction is run for 1 hour at 150° C., and methyl phenylacetate is isolated according to the procedure of Example 25.

Example 27

A 400 cc. stainless steel bomb is charged with 9.7 g. of allyl bromide, 4.4 g. of sodium methoxide, 5 g. of 5% palladium on carbon, and 50 ml. of toluene. After the bomb is purged with nitrogen, 5.3 g. of carbon dioxide is added, and the bomb is pressurized to 163 p.s.i.g. with carbon monoxide. The bomb is sealed, and placed in a rack where it can be both heated and shaken. The agitating mixture is heated for 2 hours at 100° C. under autogenous pressure (255 p.s.i.g.). The bomb is cooled, and the slurry is filtered. The filtrate is distilled through a 40 cm. spinning band column, and the fraction boiling at 96–101° C. is collected. Infra-red and mass spectral data show that both methyl 3-butenate and methyl 1-butenate are present along with some allyl bromide and toluene.

Example 28

A carbonylation reaction is run according to the procedure of Example 27, substituting 13.4 g. of allyl iodide for the allyl bromide. The reaction is run for 1 hour at 75° C., and the esters are isolated according to the procedures of Example 27.

Example 29

A carbonylation reaction is run according to the procedure of Example 27, substituting 10.8 g. of 1-bromo-2-butene for the allyl bromide. The reaction is run for 2 hours at 100° C., and the methyl 3-pentenoate and methyl 2-pentenoate are isolated by distillation of the filtrate from the bomb.

Example 30

A carbonylation reaction is run according to the procedures of Example 27, substituting 9.5 g. of 3-bromopropyne for the allyl bromide. The reaction is run for 1 hour at 100° C., and methyl 4-butynoate and methyl butadienoate are isolated from the filtrate by distillation.

Example 31

A carbonylation reaction is run according to the procedures of Example 27, substituting 6.1 g. of allyl chloride for the allyl bromide. The reaction is run for 0.5 hour at 340° C., and the same esters are isolated by distillation.

Example 32

A carbonylation reaction is run according to the procedures of Example 27, substituting 5.5 g. of sodium ethoxide for the sodium methoxide. The analogous ethyl esters are isolated after completion of the reaction.

Example 33

A carbonylation reaction is run according to the procedures of Example 27, substituting 15.7 g. of 1-phenyl-3-bromopropene for the allyl bromide. The methyl 4-phenyl-3-butenoate is isolated by distillation.

Example 34

A carbonylation reaction is run according to the procedures of Example 27, substituting 12.9 g. of 3-bromocyclohexene for the allyl bromide. The methyl 2-cyclohexenecarboxylate and methyl 1-cyclohexenecarboxylate are isolated from the filtrate by distillation.

Example 35

A 400 cc. stainless steel bomb is charged with 15.6 g. of α,3,4-trichlorotoluene, 4.4 g. of sodium methoxide, 5 g. of 5% palladium on carbon and 50 ml. of xylene. After the bomb is purged with nitrogen, 5.3 g. of carbon dioxide is added and the bomb is pressurized to 165 p.s.i.g. with carbon monoxide. The bomb is sealed and placed in a rack where it can be both heated and shaken. The agitating mixture is heated for 1 hour at 225° C. under autogenous pressure. The bomb is cooled, and the slurry is boiled in 300 ml. of xylene. The boiling slurry is filtered, and methyl 3,4-dichlorophenylacetate is isolated from the filtrate.

Example 36

11.4 grams of methyl iodide, 4.4 g. sodium methylate, 5.0 g. of 5% palladium on carbon, and 50 ml. xylene are added to a 400 cc. bomb. The bomb is closed, and 5.3 g. carbon dioxide is added. The bomb is then charged with 165 p.s.i.g. of carbon monoxide at 25° C. The bomb and contents are heated for 2 hours at 250° C. The maximum pressure developed is 510 p.s.i.g. The bomb is cooled and vented and the resulting slurry is filtered to remove the catalyst. The filtrate is distilled, and methyl acetate is isolated in the fraction boiling at 45–55° C.

Example 37

16.8 grams of cyclohexyl iodide are substituted for the methyl iodide of Example 36 and are reacted in a similar fashion. Cyclohexanecarboxylic acid, methyl ester, is isolated from the filtrate by distillation in the fraction boiling at 180–186° C.

Example 38

15.9 grams of 4-bromoacetophenone, 4.4 g. sodium methylate, 5.0 grams of 5% palladium on carbon, and 50 ml. xylene are added to a 400 cc. bomb. The bomb is closed and 5.3 grams of carbon dioxide is added. The bomb is then charged to 165 p.s.i.g. with carbon monoxide at 25° C. The bomb and contents are heated at 250° C. for one hour. The maximum pressure generated is 600 p.s.i.g. The bomb is cooled and vented, and the contents are filtered while warm to remove the catalyst. Methyl 4-acetylbenzoate is isolated from the filtrate (M.P. 92° C.).

What is claimed is:

1. A process for the preparation of organic esters by reacting at a temperature of from 100° C. to 400° C. and a pressure of from 100 to 5,000 pounds per square inch (1) carbon monoxide, (2) an aryl halide where said halide is iodine, bromine or chlorine and (3) an alcoholate of 1 to 6 carbon atoms selected from the alkali alcoholates or alkaline earth alcoholates, said reaction takes place in the presence of (a) at least one equivalent of carbon dioxide per equivalent of alcoholate and (b) a palladium catalyst.

2. The process of claim 1 where carbon monoxide is present in an amount to provide at least one equivalent of carbon monoxide per equivalent of organic halide.

3. The process of claim 1 where said catalyst is present in an amount of between 0.01 to 50 mole percent of palladium based on the organic halide.

4. The process of claim 3 where the reaction ingredients are dispersed in a solvent which is substantially free of active hydrogen atoms.

5. The process of claim 3 where said pressure is 200 to 1000 p.s.i.

6. The process of claim 3 where said organic halide is 4,4'-biphenyldihalide where said halide is bromine or chlorine and said alcoholate has 1 to 2 carbon atoms.

7. The process of claim 6 where the reaction temperature is between 225 to 275° C. and when the halide is bromine.

References Cited

UNITED STATES PATENTS

| | | | |
|---|---|---|---|
| 2,914,554 | 11/1959 | Kroeper et al. | 260—475 |
| 3,452,090 | 6/1969 | Mador et al. | 260—544 A |

LORRAINE A. WEINBERGER, Primary Examiner

E. J. SKELLY, Assistant Examiner

U.S. Cl. X.R.

260—465 D, 465.4, 468 CB, 473 R, 476 R, 483, 485 R, 486 AC, 493